(12) United States Patent
Mohapatra et al.

(10) Patent No.: US 7,296,833 B2
(45) Date of Patent: Nov. 20, 2007

(54) BUMPER SYSTEM WITH INTEGRATED ENERGY ABSORBER UNDERBAR

(75) Inventors: Subhransu Mohapatra, Bangalore (IN); Alok Nanda, Bangalore (IN); Frank Mooijman, The Netherlands (NL)

(73) Assignee: SABIC Innovative Plastics IP BV, Pittsfield, MA (US)

( * ) Notice: Subject to any disclaimer, the term of this patent is extended or adjusted under 35 U.S.C. 154(b) by 102 days.

(21) Appl. No.: 11/236,398

(22) Filed: Sep. 27, 2005

(65) Prior Publication Data
US 2007/0069535 A1 Mar. 29, 2007

(51) Int. Cl.
*B60R 19/03* (2006.01)
*B60R 19/04* (2006.01)

(52) U.S. Cl. ..................................... 293/121
(58) Field of Classification Search ............... 293/120, 293/121, 122, 103, 146
See application file for complete search history.

(56) References Cited

U.S. PATENT DOCUMENTS

| | | | |
|---|---|---|---|
| 5,215,343 A * | 6/1993 | Fortune | 293/121 |
| 6,726,262 B2 | 4/2004 | Marijnissen et al. | |
| 2001/0026073 A1 | 10/2001 | Sato et al. | |

FOREIGN PATENT DOCUMENTS

| | | | |
|---|---|---|---|
| EP | 1138556 | A2 | 10/2001 |
| EP | 1138557 | A2 | 10/2001 |
| EP | 1138557 | A3 | 10/2001 |
| EP | 1139557 | A3 | 10/2001 |
| EP | 1 293 389 | A1 | 3/2003 |
| EP | 1293389 | A1 * | 3/2003 |
| EP | 1 067 039 | B1 | 8/2005 |
| EP | 1 577 167 | A2 | 9/2005 |
| JP | 2004276673 | A * | 10/2004 |
| WO | WO 99/56990 | | 11/1999 |
| WO | WO 01/00478 | A1 | 6/2000 |
| WO | WO 2005/012043 | A1 | 2/2005 |

OTHER PUBLICATIONS

Computer Translation for EP 1 293 389 from http://world.altavista.com/tr.*
European Search Report and Opinion, European Patent Office, International Application No. PCT/US2006/035606, Date of Completion Dec. 13, 2006, 5 pages.

* cited by examiner

*Primary Examiner*—Dennis H Pedder
*Assistant Examiner*—Melissa Black
(74) *Attorney, Agent, or Firm*—Armstrong Teasdale LLP

(57) ABSTRACT

A bumper system for an automobile vehicle includes, in an exemplary embodiment, a beam configured to attach to the vehicle, and a thermoplastic energy absorber coupled to the beam. The energy absorber includes an upper portion including a frame portion and a body having a plurality of tunable crush lobes extending from the frame portion. The energy absorber also includes an underbar spaced apart from the upper portion and a plurality of connecting towers extending between the upper portion and the underbar and connecting the underbar to the upper portion.

17 Claims, 5 Drawing Sheets

BUMPER SYSTEM WITH INTEGRATED ENERGY ABSORBER UNDERBAR

BACKGROUND OF THE INVENTION

This invention relates generally to automobile vehicle bumpers, and more particularly, to energy absorbing vehicle bumper systems.

A known standard which bumper systems often are designed to meet is the United States Federal Motor Vehicle Safety Standard (FMVSS). For example, some energy absorbing bumper systems attempt to reduce vehicle damage as a result of a low speed impact by managing impact energy and intrusion while not exceeding a rail load limit of the vehicle. In addition, some bumper systems attempt to reduce pedestrian injury as a result of an impact.

A bumper system typically includes a beam that extends widthwise across the front or rear of a vehicle and is mounted to rails that extend in a lengthwise direction. The beam typically is steel, and the steel beam is very stiff and provides structural strength and rigidity. To improve the energy absorbing efficiency of a bumper system, some bumper systems also include shock absorbers.

The efficiency of an energy absorbing bumper system, or assembly, is defined as the amount of energy absorbed over distance, or the amount of energy absorbed over load. A high efficiency bumper system absorbs more energy over a shorter distance than a low energy absorber. High efficiency is achieved by building load quickly to just under the rail load limit and maintaining that load constant until the impact energy has been dissipated.

To improve the energy absorbing efficiency, shock absorbers sometimes are positioned, for example, between the steel bumper beam and the vehicle rails. The shock absorbers are intended to absorb at least some of the energy resulting from an impact. Adding shock absorbers to a bumper assembly results in an added cost and complexity as compared to a steel beam. The shocks also add weight to the bumper assembly, which is also undesirable since such added weight may reduce the overall fuel efficiency of the vehicle.

Further, there is a need to incorporate pedestrian protection aspects into bumper systems in cars having multiple design constraints. Design constraints can include, for example, limited package space, small bumper beam height, constrained vertical space above and below the bumper beam and the lack of space to place a suitable back support for an under-bar like structure.

BRIEF DESCRIPTION OF THE INVENTION

In one aspect, a bumper system for an automobile vehicle is provided. The bumper system includes a beam configured to attach to the vehicle, and a thermoplastic energy absorber coupled to the beam. The energy absorber includes an upper portion including a frame portion and a body having a plurality of tunable crush lobes extending from the frame portion. The energy absorber also includes an underbar spaced apart from the upper portion and a plurality of connecting towers extending between the upper portion and the underbar and connecting the underbar to the upper portion.

In another aspect, a bumper system for an automobile vehicle is provided. The bumper system includes a beam configured to attach to the vehicle, a thermoplastic energy absorber coupled to the beam, the energy absorber being tunable for meeting predetermined criteria for both low speed and pedestrian impacts, and a fascia positioned and sized to envelop the beam and the energy absorber. The energy absorber includes an upper portion including a frame portion and a body having a plurality of tunable crush lobes extending from the frame portion with each crush lobe longitudinally spaced apart from an adjacent crush lobe. The energy absorber also includes an underbar spaced apart from the upper portion and a plurality of connecting towers extending between the upper portion and the underbar and connecting the underbar to the upper portion.

In another aspect, an energy absorber attachable to a beam in a vehicle bumper system is provided. The energy absorber is tunable for meeting predetermined criteria for both low speed and pedestrian impacts and includes an upper portion having a frame portion and a body. The body includes a plurality of tunable crush lobes extending from the frame portion with each crush lobe longitudinally spaced apart from an adjacent crush lobe. The energy absorber also includes an underbar spaced apart from the upper portion, and a plurality of connecting towers extending between the upper portion and the underbar and connecting the underbar to the upper portion.

DETAILED DESCRIPTION OF THE INVENTION

A bumper system that includes a tunable energy absorber having an integrated underbar is described below in detail. In an example embodiment, an energy absorber of the non-foam type is attached to a beam. The beam is fabricated, for example, from steel, aluminum, or glass mat thermoplastic (GMT). The energy absorber, in the example embodiment, is fabricated from Xenoy® material and is tunable so as to meet desired impact criteria, e.g., pedestrian and low speed impacts. More particularly, the energy absorber with integrated underbar, in one embodiment, is mounted to the bumper beam on top and to the fascia mounting holes at the bottom. A connecting tower integral to the one-piece energy absorber joins the upper portion of the energy absorber and the underbar. The underbar derives stiffness from the upper energy absorber portion through the connecting tower. Because of this, the one-piece energy absorber doesn't require any support from the back for the underbar and in the process saves considerable space in an aggressive packaging environment, simplifies the design and integrates parts. The support by the underbar to the lower leg during an impact event considerably reduces the rotation of the leg and at the same time provides flexibility to restrict acceleration in a tight package space. In other embodiments, where the integrated underbar is not mounted on fascia mounts, the required stiffness for the underbar can be obtained through the tower or from a different material than the upper portion. The transition between the upper portion of the energy absorber and the connecting tower holds the two pieces together in low speed impact, but shears off in high-speed impact. In another embodiment, a stiffer, but more brittle material like a glass filled material for the underbar can also give the required higher stiffness during low speed impact, but would fail under high speed impact.

Although the bumper system is described below with reference to specific materials (e.g. Xenoy® material (commercially available from General Electric Company, Pittsfield, Mass.) for the energy absorber), the system is not limited to practice with such materials and other materials can be used. For example, the beam need not necessarily be a steel, aluminum, or GMT compression molded beam, and other materials and fabrication techniques can be utilized. Generally, the energy absorber is selecting from materials that result in efficient energy absorption, and the beam materials and fabrication technique are selected to result in a stiff beam.

Figure 1:
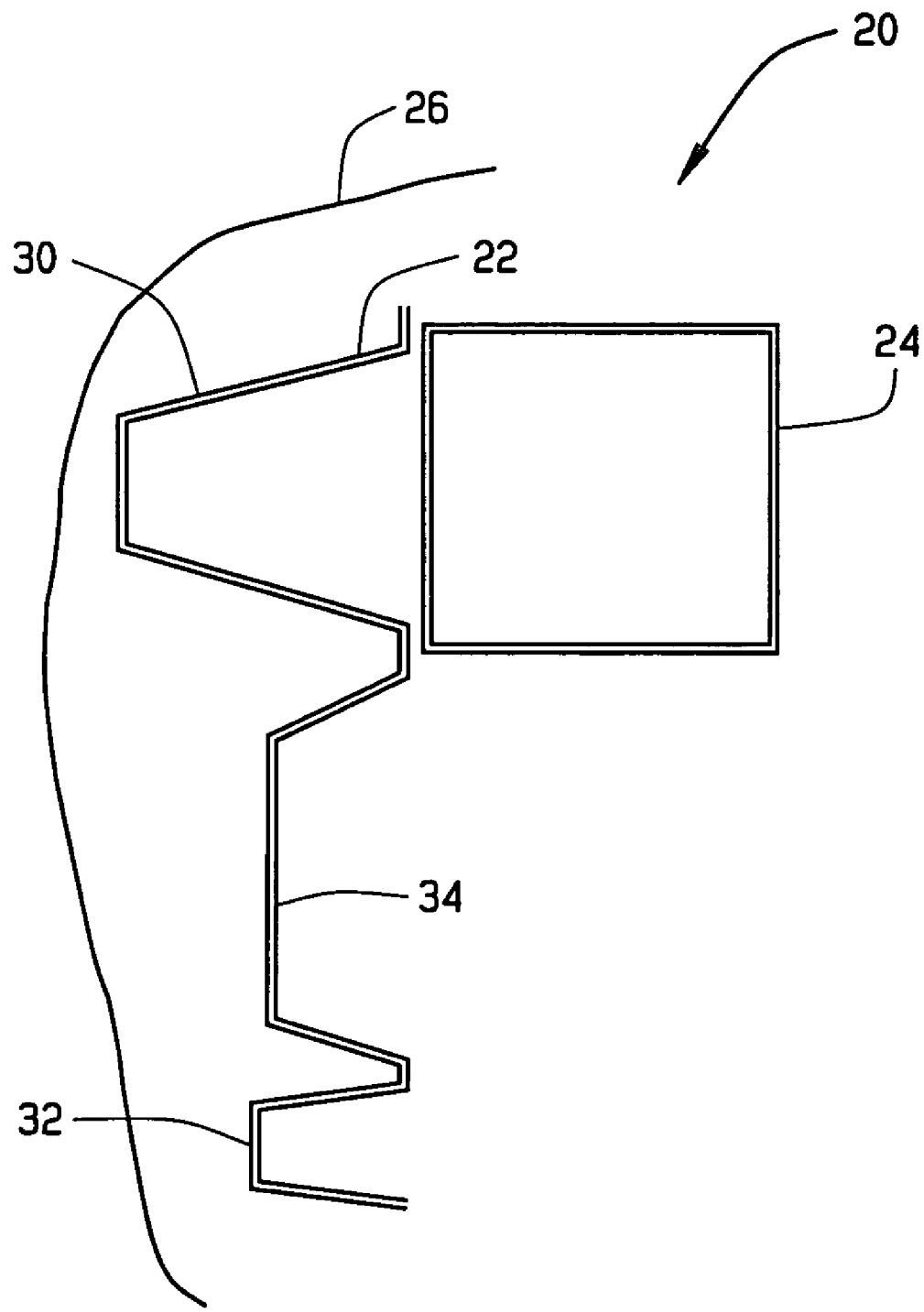
FIG. 1 is a sectional schematic illustration of a bumper system in accordance with an embodiment of the present invention.

FIG. 1 is a sectional schematic illustration of an exemplary embodiment of a bumper system 20. System 20 includes an energy absorber 22 and a beam 24. Energy absorber 22 is positioned between beam 24 and a fascia 26 which, when assembled, form a vehicle bumper. As should be understood by those skilled in the art, beam 24 is attached to lengthwise extending frame rails (not shown) of an automobile vehicle.

Fascia 26 typically is generally formed from a thermoplastic material amenable to finishing utilizing conventional vehicle painting and/or coating techniques. Generally, fascia 26 envelops both energy absorber 22 and reinforcing beam 24 such that neither component is visible once attached to the vehicle.

Beam 24, in the example embodiment, is fabricated from extruded aluminum. In other embodiments, beam 24 is fabricated from roll formed steel or a compression molded glass mat thermoplastic (GMT). Beam 24 can have one of multiple geometries, including being configured as a B-section, a D-section, an I-beam, or having a C or W cross-sectional shape. The geometry of beam 24 is selected to provide a desired section modulus depending on the particular application in which the beam is to be used.

Figure 2:
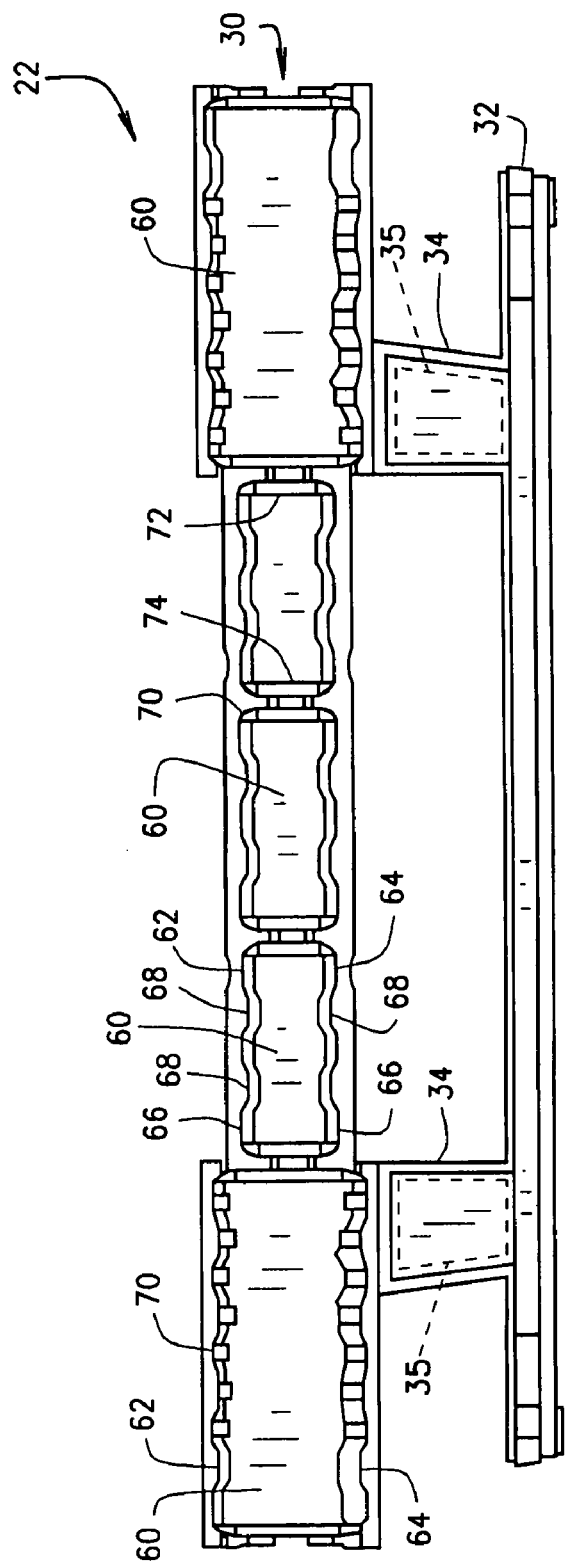
FIG. 2 is front schematic illustration of the energy absorber shown in FIG. 1.
Figure 3:
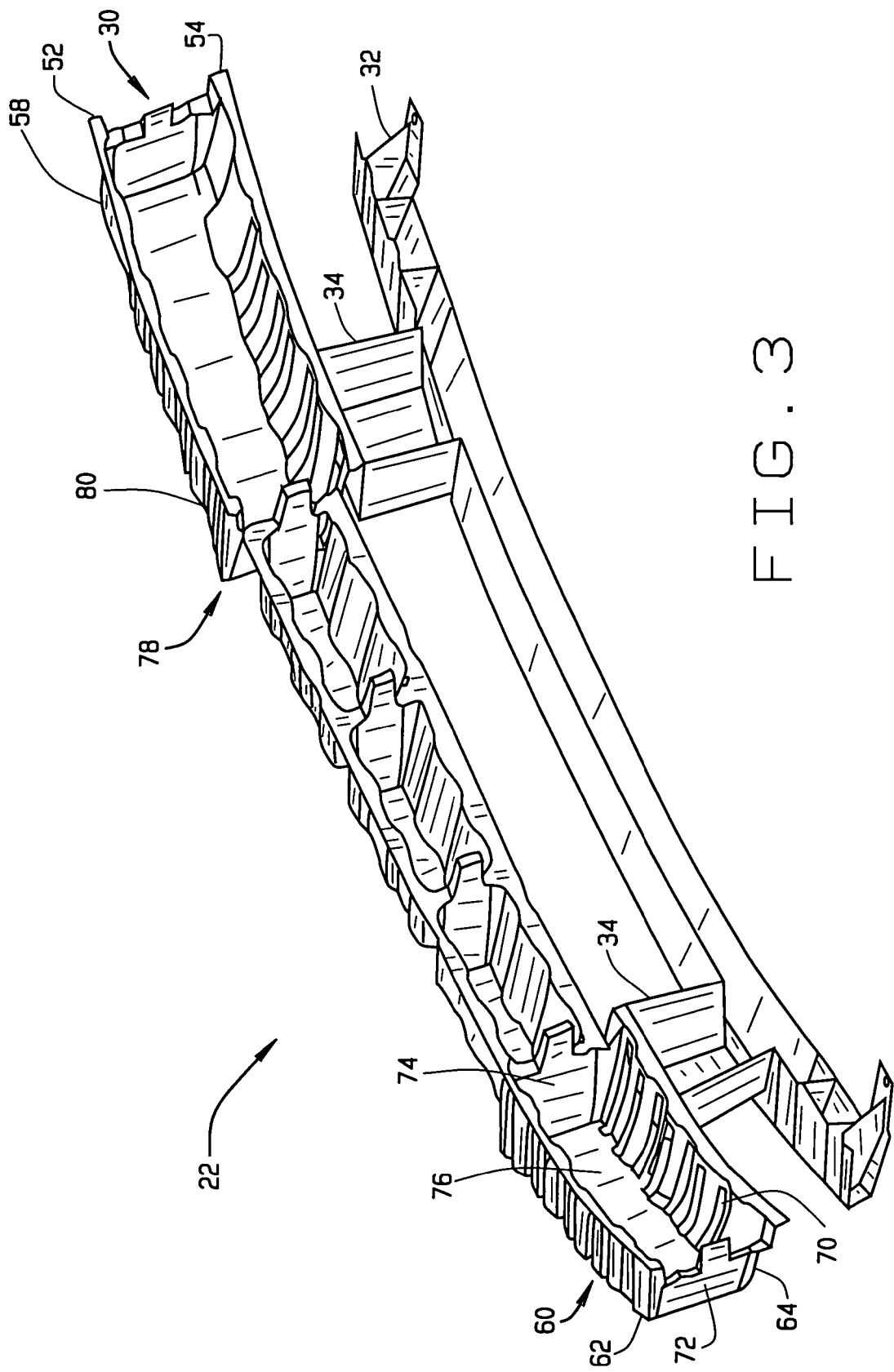
FIG. 3 is a rear perspective schematic illustration of the energy absorber shown in FIG. 1.
Figure 4:
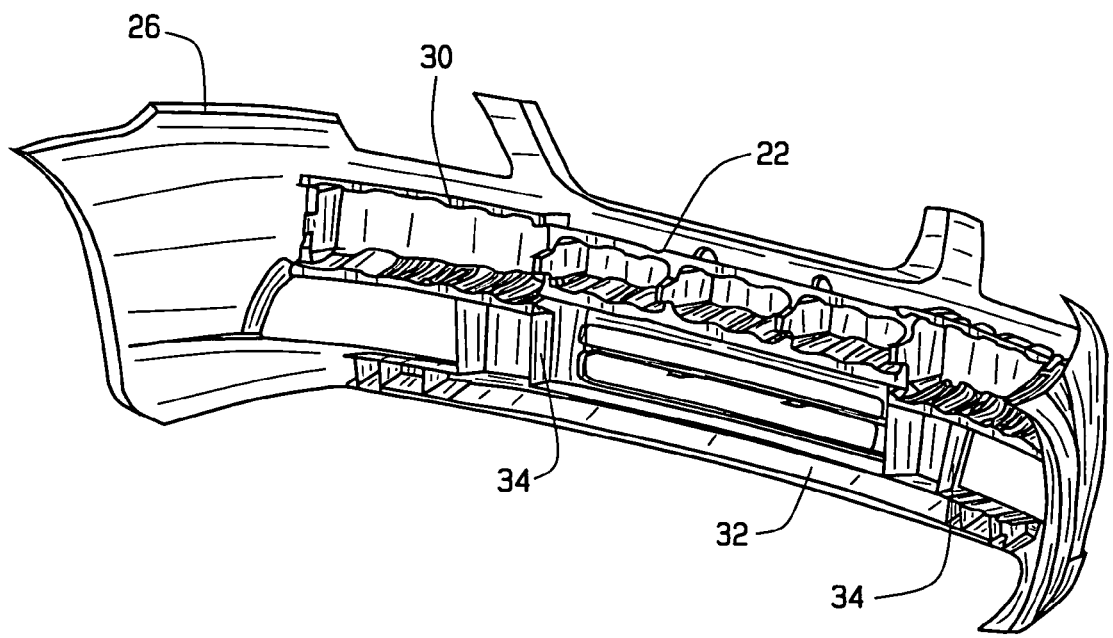
FIG. 4 is a rear perspective schematic illustration of the energy absorber and fascia shown in FIG. 1.

Referring also to FIGS. 2, 3, and 4, energy absorber 22 includes an upper portion 30, an underbar 32, and a plurality of connecting towers 34 that connect underbar 32 to upper portion 30. Energy absorber upper portion 30 includes a frame portion 50 having first and second longitudinally extending flanges 52 and 54, respectively which are used to attach energy absorber 22 to beam 24. Upper portion 30 further includes a body 58 that extends outward from frame portion 50.

Energy absorber upper portion body 58, includes a plurality of crush lobes 60 extending from frame 50 between flanges 52 and 54. Each crush lobe 60 is spaced apart from each other and includes a first transverse wall 62 and a second transverse wall 64. Transverse walls 62 and 64 are rippled and include alternating raised areas 66 and depressed areas 68 which provide the transverse walls with an added degree of stiffness to resist deflection upon impact. Transverse walls 62 and 64 can further include a plurality of windows or openings 70. The width and depth dimensions of the ripples, as well as the dimensions of openings 70, can be modified to achieve different stiffness characteristics as desired. Each crush lobe 60 also includes a first side wall 72 and a second side wall 74. An outer wall 76 extends between the distal ends of transverse walls 62 and 64, and side walls 72 and 74.

In further exemplary embodiments, side walls 72 and 74 and transverse walls 62 and 64 vary linearly in thickness from a first front-most portion 78 to a rearmost portion 80. In one embodiment, the wall thickness varies from about 1 millimeter (mm) to about 7 mm, in another embodiment, from about 1.5 mm to about 5 mm, and still another embodiment, from about 2.5 mm to about 3.5 mm. In further embodiments, the thickness of the walls is constant from front-most portion 78 to rearmost portion 80 and is between about 1 mm to about 7 mm. In still further embodiments, the thickness of the walls are stepped. Particularly, the thickness of the walls of front-most portion 78 is constant and the thickness of the walls of rearmost portion 80 is constant with the walls of rearmost portion 80 thicker than the walls of front-most portion 78.

Crush lobes 60 are tunable in that by selecting a thickness of each portion 78 and 80, the response of crush lobes can be altered. For example, front portion 78 of crush lobes 60 is tuned, and tunable, to absorb pedestrian leg from impact, and rear portion 80 is tuned, and tunable, for low speed and pendulum impact.

Each crush lobe 60 can, of course, have any one of a number of different geometries depending on the impact energy requirements for the vehicle. Each crush lobe 60 has an axial crush mode in both barrier and pendulum impacts according to Federal Motor Vehicle Safety Standard (FMVSS) and also has a stiffness tunability in order to meet the desired impact load deflection criteria.

Another aspect in appropriately tuning energy absorber 22 is the selection of the thermoplastic resin to be employed. The resin employed may be a low modulus, medium modulus or high modulus material as needed. By carefully considering each of these variables, energy absorbers meeting the desired energy impact objectives can be manufactured.

The characteristics of the material utilized to form energy absorber 22 include high toughness/ductility, thermally stable, high energy absorption capacity, a good modulus-to-elongation ratio and recyclability. While the energy absorbers may be molded in segments, the absorbers also can be of unitary construction made from a tough plastic material. An example material for the absorbers is XENOY® material, as referenced above. Of course, other engineered thermoplastic resins can be used. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide (NORYL GTX® from General Electric Company), blends of polycarbonate/PET/PBT, polybutylene terephthalate and impact modifier (XENOY® resin from General Electric Company), polyamides, phenylene sulfide resins, polyvinyl chloride PVC, high impact polystyrene (HIPS), low/high density polyethylene, polypropylene and thermoplastic olefins (TPO).

As best seen in FIG. 3, in the exemplary embodiment, underbar 32 has a C-shaped cross-section. In alternate embodiments, underbar 32 can have any suitable cross-sectional shape, for example, cylindrical, rectangular, square, polygonal, and the like.

Figure 5:
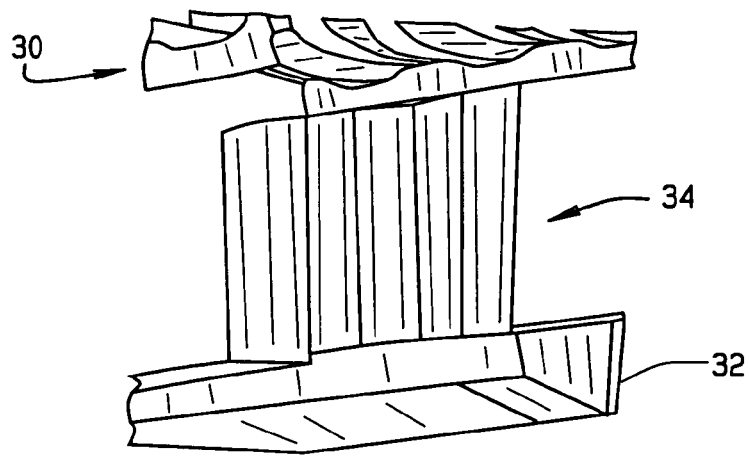
FIG. 5 is a rear perspective schematic illustration of the connecting tower shown in FIG. 1.
Figure 6:
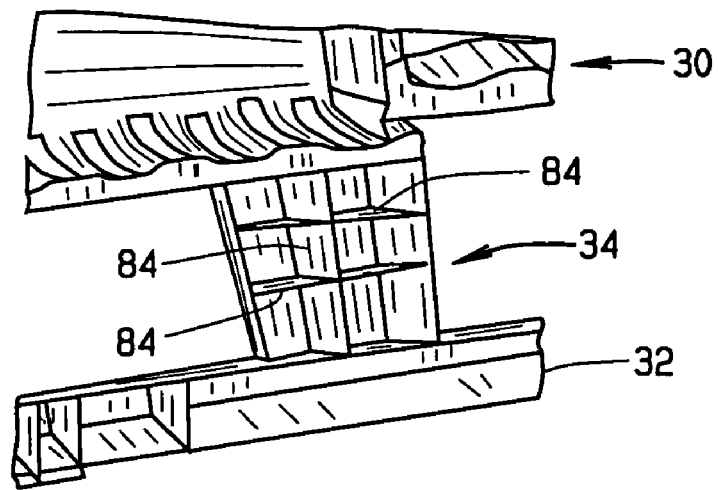
FIG. 6 is a rear perspective schematic illustration of another embodiment of the connecting tower shown in FIG. 1.
Figure 7:
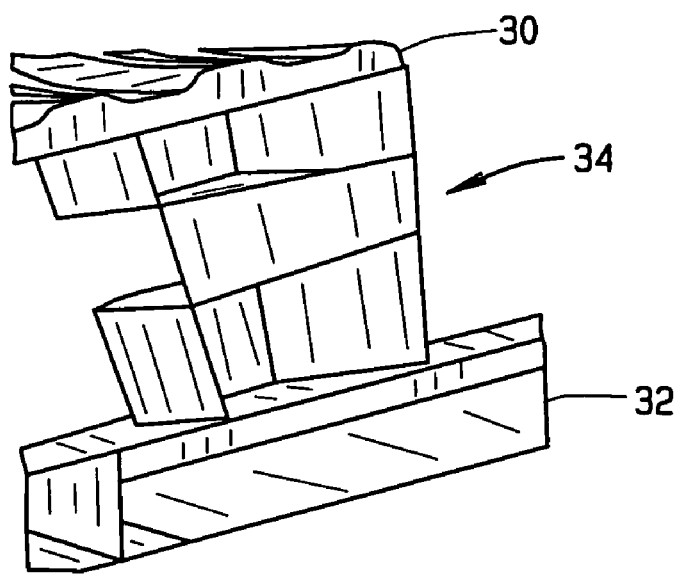
FIG. 7 is a rear perspective schematic illustration of another embodiment of the connecting tower shown in FIG. 1.

Connecting towers 34 connect underbar 32 to upper portion 30 of energy absorber 22 and provide stiffness to underbar 32 without the need of a backing support beam. Connecting towers 34 can have any suitable shape. In the exemplary embodiment, connecting tower 34 has a substantially C-shape as shown in FIGS. 3, 4, and 5. In an alternate embodiment illustrated in FIG. 6, connecting tower 34 is C-shaped and further includes strengthening ribs 84. In another alternate embodiment illustrated in FIG. 7, connecting tower 34 has a substantially W-shape. In another embodiment, connecting tower 34 includes a molded-in metal backbone 35 for added strength (shown in FIG. 2). The metal backbone 35 is overmolded by the thermoplastic material used to form connecting tower 34.

As shown in FIG. 4, underbar 32 can be attached to fascia 26 for stability. In other embodiments, where integrated underbar 32 is not mounted to fascia 26, the required stiffness for underbar 32 is obtained through connecting tower 34. Also, underbar 32 can be formed from a different thermoplastic material than upper portion 30 of energy absorber 22. Further, the transition between upper portion 30 of energy absorber 22 and connecting tower 34 can include a design feature that holds the upper portion 30 and connecting tower 34 together in a low speed impact event, but shears off in an high-speed impact event. In another embodiment, underbar 32 can be formed from a stiffer, but more brittle material like a glass filled thermoplastic material that provide the desired higher stiffness during low speed impact, but that fails under high speed impact.

While the invention has been described in terms of various specific embodiments, those skilled in the art will recognize that the invention can be practiced with modification within the spirit and scope of the claims.

What is claimed is:

1. A bumper system for an automobile vehicle, said bumper system comprising:
    a beam configured to attach to the vehicle; and
    a thermoplastic energy absorber coupled to said beam, said energy absorber comprising:
    an upper portion comprising a frame portion and a body comprising a plurality of tunable crush lobes extending from said frame portion;
    an underbar spaced apart from said upper portion and positioned below said beam; and
    a plurality of connecting towers extending between said upper portion and said underbar and connecting said underbar to said upper portion;
    said upper portion of said energy absorber comprising a first thermoplastic material and said underbar and plurality of connecting towers comprising a second thermoplastic material.

2. A bumper system in accordance with claim 1 wherein said plurality of connecting towers comprise at least one of a C-shape, a W-shape, and a ribbed C-shape.

3. A bumper system in accordance with claim 2 wherein at least one of said plurality of connecting towers further comprises a molded-in metal backbone.

4. A bumper system in accordance with claim 1 wherein said second thermoplastic material has a stiffness characteristic that is stiffer than the stiffness characteristic of said first thermoplastic material.

5. A bumper system in accordance with claim 1 wherein said second thermoplastic material is more brittle than said first thermoplastic material.

6. A bumper system in accordance with claim 1 wherein said beam comprises at least one of steel, aluminum, thermoplastic, and glass mat thermoplastic.

7. A bumper system in accordance with claim 1 further comprising a fascia positioned and sized to envelop said beam and said energy absorber.

8. A bumper system for an automobile vehicle, said bumper system comprising:
    a beam configured to attach to the vehicle;
    a thermoplastic energy absorber coupled to said beam, said energy absorber being tunable for meeting predetermined criteria for both low speed and pedestrian impacts; and
    a fascia positioned and sized to envelop said beam and said energy absorber;
    said energy absorber comprising:
    an upper portion comprising a frame portion and a body, said body comprising a plurality of tunable crush lobes extending from said frame portion, each said crush lobe longitudinally spaced apart from an adjacent crush lobe;
    an underbar spaced apart from said upper portion and positioned below said beam; and
    a plurality of connecting towers extending between said upper portion and said underbar and connecting said underbar to said upper portion;
    said upper portion of said energy absorber comprising a first thermoplastic material and said underbar and plurality of connecting towers comprising a second thermoplastic material.

9. A bumper system in accordance with claim 8 wherein said plurality of connecting towers comprise at least one of a C-shape, a W-shape, and a ribbed C-shape.

10. A bumper system in accordance with claim 9 wherein at least one of said plurality of connecting towers further comprises a molded-in metal backbone.

11. A bumper system in accordance with claim 8 wherein said second thermoplastic material has a stiffness characteristic that is stiffer than the stiffness characteristic of said first thermoplastic material.

12. A bumper system in accordance with claim 8 wherein said second thermoplastic material is more brittle than said first thermoplastic material.

13. A bumper system in accordance with claim 8 wherein said beam comprises at least one of steel, aluminum, thermoplastic, and glass mat thermoplastic.

14. An energy absorber attachable to a beam in a vehicle bumper system, said energy absorber being tunable for meeting predetermined criteria for both low speed and pedestrian impacts and comprising:
    an upper portion comprising a frame portion and a body, said body comprising a plurality of tunable crush lobes extending from said frame portion, each said crush lobe longitudinally spaced apart from an adjacent crush lobe;
    an underbar spaced apart from said upper portion so that said underbar is positioned below the beam when said energy absorber is attached to the beam; and
    a plurality of connecting towers extending between said upper portion and said underbar and connecting said underbar to said upper portion;
    said upper portion of said energy absorber comprising a first thermoplastic material and said underbar and plurality of connecting towers comprising a second thermoplastic material.

15. A bumper system in accordance with claim 14 wherein said plurality of connecting towers comprise at least one of a C-shape, a W-shape, and a ribbed C-shape.

16. A bumper system in accordance with claim 15 wherein at least one of said plurality of connecting towers further comprises a molded-in metal backbone.

17. A bumper system in accordance with claim 14 wherein said second thermoplastic material has a stiffness characteristic that is stiffer than the stiffness characteristic of said first thermoplastic material, and wherein said second thermoplastic material is more brittle than said first thermoplastic material.

* * * * *